US007720644B2

(12) United States Patent
Barford

(10) Patent No.: US 7,720,644 B2
(45) Date of Patent: May 18, 2010

(54) METHOD AND APPARATUS OF SPECTRAL ESTIMATION

(75) Inventor: Lee A. Barford, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1246 days.

(21) Appl. No.: 11/229,479

(22) Filed: Sep. 16, 2005

(65) Prior Publication Data

US 2007/0067167 A1 Mar. 22, 2007

(51) Int. Cl.
*G10L 21/02* (2006.01)
(52) U.S. Cl. .................. 702/189; 702/122; 342/417; 375/224; 375/130; 455/517; 455/522; 704/226
(58) Field of Classification Search .............. 702/22, 702/189; 375/224, 226, 130, 141, 147, 136; 324/450, 457, 350, 357.06, 357.01, 386, 324/417; 370/463, 477; 455/522, 517; 704/226
See application file for complete search history.

(56) References Cited

U.S. PATENT DOCUMENTS

| 5,233,632 | A | * | 8/1993 | Baum et al. ................. 375/344 |
| 6,249,683 | B1 | * | 6/2001 | Lundby et al. .............. 455/522 |
| 6,493,380 | B1 | * | 12/2002 | Wu et al. ..................... 375/224 |
| 6,735,539 | B2 | * | 5/2004 | Barford ........................ 702/76 |
| 6,937,641 | B2 | * | 8/2005 | Li et al. ........................ 375/141 |
| 6,975,880 | B2 | * | 12/2005 | Lundby et al. .............. 455/522 |
| 7,031,740 | B2 | * | 4/2006 | Lundby et al. .............. 455/522 |
| 7,035,661 | B1 | * | 4/2006 | Yun ............................. 455/522 |
| 7,107,069 | B2 | * | 9/2006 | Lundby et al. .............. 455/522 |
| 7,181,170 | B2 | * | 2/2007 | Love et al. ................ 455/67.13 |
| 7,293,102 | B2 | * | 11/2007 | Emerson ..................... 709/232 |
| 7,397,867 | B2 | * | 7/2008 | Moore et al. ................ 375/316 |
| 2001/0011024 | A1 | * | 8/2001 | Lundby et al. .............. 455/522 |
| 2003/0026324 | A1 | * | 2/2003 | Li et al. ....................... 375/141 |
| 2004/0132476 | A1 | * | 7/2004 | Lundby et al. .............. 455/522 |
| 2004/0132477 | A1 | * | 7/2004 | Lundby et al. .............. 455/522 |
| 2005/0157804 | A1 | * | 7/2005 | Jones ........................... 375/261 |
| 2006/0270443 | A1 | * | 11/2006 | Lundby et al. .............. 455/522 |
| 2008/0240282 | A1 | * | 10/2008 | Lin .............................. 375/285 |

OTHER PUBLICATIONS

E. Lahalle et al., "Continuous ARMA Spectral Estimation from Irregularly Sampled Observations," IMTC 2004—Instrumentation and Measurement Technology Conference, Como, Italy, May 18-20, 2004, pp. 923-927.
G. Pasini et al., "Hardware Implementation of a Broad-Band Vector Spectrum Analyzer Based on Randomized Sampling," IMTC 2004—Instrumentation and Measurement Technology Conference, Como, Italy, May 18-20, 2004, pp. 952-957.
Susan Blackford, "QR Factorization," http://www.netlib.org/lapack/lug/node40.html, pp. 1-2.
G. Golub and C. Van Loan, Matrix Computations 2nd Edition, The Johns Hpkins University Press, 1989, Chapter 5, pp. 193-259 and Chapter 12, Section 6, pp. 592-600.

* cited by examiner

Primary Examiner—Carol S Tsai

(57) ABSTRACT

A spectrum of a set of samples from a data stream of sampled data is estimated until a targeted signal to noise ratio is achieved.

13 Claims, 3 Drawing Sheets

US 7,720,644 B2

METHOD AND APPARATUS OF SPECTRAL ESTIMATION

CROSS-REFERENCE TO RELATED APPLICATIONS

N/A

STATEMENT REGARDING FEDERALLY SPONSORED RESEARCH OR DEVELOPMENT

N/A

BACKGROUND

Data collection networks often sample data at a first location and then transmit the sampled data to another location for processing and analysis. In some data collection networks, data may be sampled randomly or irregularly as a function of time. In particular, a time interval between individual samples may vary essentially randomly as a function of time.

Examples of such data collection networks include, but are not limited to, a wideband test system with random sampling and a time synchronized, low power network of sensors. A wideband test system with random sampling, when accompanied by accurate timestamping (e.g., time synchronization) of the samples, facilitates wideband signal characterization using average sample rates far below a conventional Nyquist sampling rate for the signal. In another wideband signal test situation, particular tests often require accurate data across limited spectral range (e.g., one-tone and two-tone tests of radio frequency devices). In such situations, randomized data sampling may minimize a total amount of data required for performing the tests. With respect to low-power networked sensors, a power consumption of each sensor is often directly related to a sample rate of the sensor. In many situations, reducing the data rate by employing randomized sampling facilitates low-power operation. In addition, constraints imposed by the network (e.g., network protocols and associated timing) often place practical restrictions on sampling intervals resulting in uneven or irregularly spaced samples. U.S. Pat. No. 6,735,539 B2 to Barford, incorporated herein by reference, teaches such a system using networked sensors with unevenly spaced samples having timestamps.

A number of techniques are known for handling spectral estimation from unevenly spaced, irregular, and/or randomly spaced timestamped data. Among the known techniques are Autoregressive Moving Average (ARMA) methods, Discrete Fourier Transform (DFT) methods, and Matrix Factorization (MF) Methods. ARMA methods fit a set of timestamped input data to an ARMA model. ARMA methods require excessively high computation times rendering such methods unsuitable for many real-time applications. DFT methods typically require extremely large sets of input data with relatively small inter-sample time spacing to minimize errors in summations approximating Fourier integrals of the DFT. MF methods include, but are not limited to, methods that attempt to fit a least-squares spectrum to the sampled data. No practical means of determining a sufficient number of samples exists for such MF methods resulting in the need for excessively long measurement and computation times especially when considering real-time operations, such as in a manufacturing environment.

Accordingly, it would be desirable to have an approach to providing spectral estimation of one or both of regularly spaced and random or irregularly spaced data samples that provides a relatively accurate spectrum estimate in environments such as manufacturing and test. Such an approach would solve a long-standing need in the area of spectral estimation.

BRIEF SUMMARY

In some embodiments of the present invention, a method of spectral estimation for a data stream D of sampled data is provided. The method of spectral estimation comprises selecting a first set of samples from the data stream D. The method further comprises selecting other sets of samples to successively combine with the first set of samples to create a combined set of samples. The other sets of samples are successively combined until a measure of a signal to noise ratio for an estimated spectrum of the combined set of samples indicates a target signal to noise ratio is achieved.

In another embodiment of the present invention, a spectral estimator is provided. The spectral estimator comprises a computer processor, memory, and a computer program stored in the memory and executed by the processor. The computer program comprises instructions that, when executed by the processor, implement selecting a first set of samples from a data stream of timestamped samples, and further implement subsequently selecting other sets of timestamped samples to successively combine with the first set to create a combined set of samples. The samples are successively combined until a measure of a signal to noise ratio for an estimated spectrum of the combined set of samples indicates a target signal to noise ratio is achieved.

In another embodiment of the present invention, a test system employing spectral estimation is provided. The test system comprises an excitation source that connects to an input of a device under test and a sampler that connects to an output of the device under test. The system further comprises a spectral estimator connected to an output of the sampler. The sampler provides sampled data from the device under test to the spectral estimator. The spectral estimator implements selecting timestamped samples from the sampled data to produce a set of samples, implements evaluating a measure of a signal to noise ratio of an estimated spectrum for the set of samples, implements successively selecting additional timestamped samples to combine with the set of samples, and implements reevaluating the measure of the signal to noise ratio of the estimated spectrum for the combined set of samples. Successively selecting and re-evaluating the measure is repeated until the measure is less than a predetermined limit $\lambda$. A target signal to noise ratio is achieved when the measure is less than the predetermined limit $\lambda$.

Certain embodiments of the present invention have other features in addition to and in lieu of the features described above. These and other features of the invention are detailed below with reference to the following drawings.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which.

DETAILED DESCRIPTION

Figure 1:
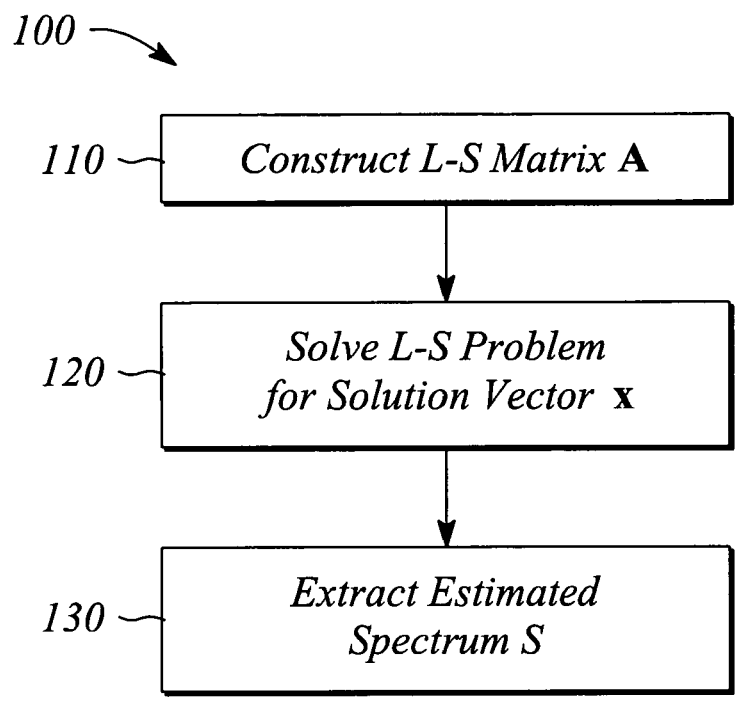
FIG. 1 illustrates a flow chart of a method of spectral estimation according to an embodiment of the present invention.

The embodiments of the present invention facilitate estimating a spectrum of a signal or a process using data from the signal or the process sampled as a function of time. The signal or the process that is time sampled, and for which the spectrum is estimated, may be essentially any signal or process, including but not limited to, a signal or a process that is monitored remotely by networked sensors and a signal associated with a test system. For example, the signal may be a signal from a device under test (DUT) wherein a test or measurement system samples the signal. In another example, a sensor may sample a physical process (e.g., temperature, radiation, etc.) as a function of time and relay the sampled data to a processor for spectral estimation. Some embodiments of the present invention are applicable to essentially any situation in which spectral estimation is performed on sampled data.

According to various embodiments of the invention, the spectral estimation may employ either regularly spaced, time-sampled data or irregularly (i.e., randomly) spaced, time-sampled data. In particular, regularly spaced time-sampled data comprises a set of data points sampled at a constant time-interval. For example, data sampled using a periodic sample time-interval may generate regularly spaced time-sampled data. Irregularly or randomly spaced time-sampled data comprises a set of data points wherein a sample time-interval or time-spacing between pairs of adjacent data points differs or varies as a function of time. For example, irregularly or randomly spaced time-sampled data is generated using a sample time-interval that is a random function of time. In another example, irregularly spaced time-sampled data is generated when the sample time-interval is essentially regularly spaced except that gaps exist in the data. A gap in the data may result from a loss during transmission of one or more consecutive data points, for example.

In some embodiments, the estimated spectrum is provided in vector form. In particular, in such embodiments, the estimated spectrum is provided as a vector of amplitude and phase values. In other embodiments, the estimated spectrum is provided as a vector comprising real and imaginary values. Furthermore, some embodiments estimate the spectrum at arbitrary predetermined frequencies.

The spectral estimation according to some embodiments of the present invention employs a least-squares method that fits a 'least-squares' spectrum to the available sampled data. In some embodiments, the estimated spectrum produced by the spectral estimation uses a near-minimum number of samples. In particular, the near-minimum number of samples is identified using a number of floating point operations only slightly greater than that required to solve a least squares fit to estimate the spectrum, according to these embodiments. In some embodiments, a trade-off between spectrum computation time and spectrum accuracy may be made by controlling operation of the spectral estimation.

In general, each data point of the data is associated with a timestamp indicating a sample time of the data point. The timestamp may be an actual or explicit timestamp generated by a sampler and transmitted along with the data point to a processor. For example, the sampler may record a pair of values $(t_n, y_n)$ where '$t_n$' represents an actual sample time and '$y_n$' denotes an actual sample value. Alternatively, the timestamp may be a virtual timestamp where only the sample value is recorded by the sampler and the sample time is provided implicitly. For example, the sampler may employ a sample clock or sample timer having a sequence of sample times that is known a priori. The a priori known (i.e., implicit or virtual) sample times may be either regularly or irregularly (e.g., randomly) spaced apart from one another. As such, the virtual timestamp is often associated with data in which the sample time is inferred from a way in which the sample is generated by the sampler.

Furthermore, the timestamp may be either a relative timestamp (e.g., indicating elapsed time since the last sample) or an absolute timestamp (i.e., based on a fixed reference or starting time). As such, an actual timestamp may be a relative timestamp or an absolute timestamp. Similarly, a virtual timestamp may be either relative or absolute. For example, one or more of an absolute actual timestamp, a relative actual timestamp, an absolute virtual timestamp and a relative virtual timestamp may be employed. For simplicity of discussion and not by way of limitation, absolute actual (explicit) timestamps are employed hereinbelow. One skilled in the art may readily employ any of the other above-mentioned timestamps and still be within the scope of the embodiments of the present invention.

As employed herein, 'randomly sampled' data is sampled data in which the sampling times are not regularly spaced as a function of time. For example, sampled data generated by measurement equipment (e.g., sensors) that sample an analog signal with a sample clock that varies randomly about a mean sample interval is randomly sampled data. In another example, randomly sampled data represents data samples that are essentially regularly sampled data with occasional gaps or missing samples in a sequence of the data samples. In yet another example of randomly sampled data, a sample time interval varies as a function of time (e.g., a sinusoidal function of time). For simplicity of discussion hereinbelow, randomly sampled data will be assumed. However, one skilled in the art may readily employ regularly spaced data that meets the Nyquist sampling criterion and still be within the scope of the embodiments of the present invention.

For example, the timestamped data may be taken or sampled at a slow average sample rate relative to a Nyquist sample rate for data. In particular, an average sample frequency may be lower than any of the frequencies of interest in the spectrum being estimated. In addition, relatively long gaps in the data are tolerated. As such, measurement equipment that has a long recovery time relative to a time scale of the signal being measured may be employed to take the samples. Allowing for long recovery times and/or relatively low sample frequencies facilitates measurement equipment design by focusing real-time aspects of the measurement equipment on generating timestamps and away from delivering data.

In some embodiments, the timestamped data is represented by a data stream. As used herein, 'data stream' refers to either a fixed size set of data points (e.g., a fixed length list of timestamped data points) or a sequence of timestamped data points that arrives at a processing location over a period of time. In particular, when employing a sequence of timestamped data points, some embodiments simply may pause and wait for a next or an additional new timestamped data point to arrive prior to continuing to process the data stream. Thus, some embodiments may be employed to generate a spectral estimate of a 'complete' set of timestamped data where the complete set represents all of the data that is or will be available. Other embodiments may generate a preliminary estimate that is subsequently updated as new data in the data stream arrives and is processed.

In general, a data stream D may be represented as a set of pairs of values $(t_n, y_n)$, each pair comprising a timestamp $t_n$ value and a corresponding data point $y_n$, value, where n is an index of each of the pairs, and wherein the term 'index' refers to a location of the pair within the data stream. In particular, in some embodiments, the data stream D is a set of value pairs $(t_n, y_n)$, the set having a cardinality or a size $|T|$ (i.e., n=1, 2, ... |T|). Therefore, the data stream D may be defined by equation (1)

$$D=\{(t_1,y_1),(t_2,y_2),\ldots,(t_{|T|},y_{|T|})\} \quad (1)$$

Since the size $|T|$ is a variable, such a definition of the data stream D accommodates both the fixed size set and the sequentially arriving set, without ambiguity.

Some embodiments of the present invention estimate the spectrum at arbitrary predetermined frequencies of interest $f_m$ indexed on m. In some embodiments, an ordered set of frequencies of interest F of size $|F|$ (i.e., m=1, 2, ... |F|) is defined by equation (2)

$$F=\{f_1, f_2, \ldots, f_{|F|}\} \quad (2)$$

where $0<f_1<f_2<\ldots<f_{|F|}$. In some embodiments, the spectrum of the data stream D is estimated at $f_0=0$ Hz.

The estimated spectrum produced by some embodiments of the present invention is a vector S comprising pairs of spectral coefficients, such as real and imaginary spectral amplitudes, $(c_m, s_m)$, or corresponding amplitudes and phases, $(A_m, \phi_m)$, at each of the frequencies in the ordered set of frequencies of interest F. In some embodiments, the estimated spectrum S is given by equation (3)

$$S=\{(c_0,s_0),(c_1,s_1),\ldots,(c_{|F|},s_{|F|})\}$$

or $$S=\{(A_0,\phi_0),(A_1,\phi_1),\ldots,(A_{|F|},\phi_{|F|})\} \quad (3)$$

where m=1, 2, . . . , |F|.

The spectral estimation determines a least squares fit of the available data to a spectrum S. In general, the determined least-squares fit essentially represents an approximate solution to an overdetermined problem exemplified by a system of equations, where there are typically more equations than unknowns in the solution (i.e., an overdetermined least-squares (L-S) fitting problem). In the case of the estimated spectrum S, the least-squares fitting finds spectral coefficients (e.g., $(c_m, s_m)$ or equivalently $(A_m, \phi_m)$) that best approximate a true spectrum. In matrix notation, the overdetermined L-S fitting problem is represented as Ax=b, where x and b are vectors and A is a matrix. Generally speaking, the goal of solving any overdetermined problem is to find a solution x that makes Ax reasonably 'close' to b. In terms of the least-squares fit, the goal is to find a solution vector x that minimizes a difference Ax−b in a 'least-squares' sense (i.e., minimize $\|Ax-b\|_2$ where $\|\cdot\|_2$ is the matrix 2-norm).

In general, various decompositions or factorizations including, but not limited to, QR factorization and singular value decomposition (SVD), are employed to perform a least-squares (L-S) fit. The QR factorization determines a pair of factor matrices, Q and R, a product of which equals to the matrix A. In general, the matrix A is an m-by-n matrix of real numbers (i.e., $A \in \Re^{m \times n}$) where m and n are integers and $m \geq n$. The factor matrix R is an m-by-n upper triangular matrix (i.e., $R \in \Re^{m \times n}$) defined as a matrix in which all off-diagonal matrix elements below a principle diagonal are identically zero and the factor matrix Q is an orthogonal m-by-m matrix (i.e., $Q \in \Re^{m \times n}$). Thus, the QR factorization of the matrix A may be given by equation (4)

$$A = QR \quad \text{where} \quad (4)$$

$$R = \begin{bmatrix} r_{1,1} & r_{1,2} & \cdots & r_{1,n} \\ 0 & r_{2,2} & \cdots & r_{2,n} \\ 0 & 0 & \ddots & \vdots \\ \vdots & \vdots & & r_{n,n} \\ 0 & 0 & 0 & 0 \end{bmatrix}$$

where a product of the factor matrix Q and a transpose thereof equals an identity matrix (i.e., $Q^T Q = I$)

Typically, the QR factorization of the matrix A may be realized in a number of different ways including, but not limited to, a Householder transformation, a Givens transformation, Block Householder transformation, and a Fast Givens transformation. Details of each of the transformations listed above, as well as other QR factorizations, may be found in a number of text books on linear algebra and matrix computations known to those skilled in the art including, but not limited to, that by Golub and Van Loan, *Matrix Computations*, 2$^{nd}$ Ed., The Johns Hopkins University Press, Baltimore, Md., 1989, incorporated by reference herein in its entirety. In practice, QR factorizations are generally available as functions or subroutines associated with computer programs and related numerical computational environments including, but not limited to, Matlab®, registered to and published by The Mathworks, Inc., Natack, Mass., and LAPACK, distributed and maintained by http://www.netlib.org. One skilled in the art will readily recognize that other decompositions and methods of solving the L-S equation may be substituted for the QR decomposition without departing from the scope of the various embodiments of the present invention.

FIG. 1 illustrates a flow chart of a method 100 of spectral estimation according to an embodiment of the present invention. Method 100 of spectral estimation comprises constructing 110 a least-squares (L-S) matrix A of a least squares (L-S) problem that fits the sampled data to the estimated spectrum S. In particular, the L-S matrix A comprises a basis set of a Fourier transform of the sampled data. A solution vector x for the L-S fitting problem comprises coefficients of the Fourier transform, wherein the coefficients essentially represent the estimated spectrum S. While expressed in terms of matrices herein for discussion purposes, one skilled in the art may readily extend that which follows to other equivalent representations without undue experimentation.

In some embodiments, the L-S matrix A comprises a scale factor, namely $[1/\sqrt{2}]$, in a first column. The L-S matrix A further comprises a first submatrix and a second submatrix following the first column. The first submatrix comprises elements that are sine functions of arbitrary predetermined frequencies F and timestamps $t_n$ of selected samples of the data stream D. The second submatrix comprises elements that are cosine functions of the arbitrary predetermined frequencies F and timestamps $t_n$ of the selected samples of the data stream D. In some embodiments, the L-S matrix A is given by equation (5)

$$A = \begin{bmatrix} \frac{1}{\sqrt{2}} & \sin(2\pi t f_1) & \cos(2\pi t f_1) \\ \frac{1}{\sqrt{2}} & \sin(2\pi t f_2) & \cos(2\pi t f_2) \\ \frac{1}{\sqrt{2}} & \sin(2\pi t f_3) & \cos(2\pi t f_3) \\ \vdots & \vdots & \vdots \\ \frac{1}{\sqrt{2}} & \sin(2\pi t f_{|F|}) & \cos(2\pi t f_{|F|}) \end{bmatrix} \quad (5)$$

where $f_m$ represents an m-th one of an ordered set of frequencies of interest F indexed on m, the index m ranging from 1 to |F| (i.e., m=1, 2, ... |F|) and where the functions $\sin(2\pi t f_m)$ and $\cos(2\pi t f_m)$ are each row vectors indexed on a set of selected samples of the data and given by equations (6) and (7)

$$\sin(2\pi t f_m) = [\sin(2\pi t_1 f_m), \sin(2\pi t_2 f_m), \ldots, \sin(2\pi t_N f_m)] \quad (6)$$

$$\cos(2\pi t f_m) = [\cos(2\pi t_1 f_m), \cos(2\pi t_2 f_m), \ldots, \cos(2\pi t_N f_m)] \quad (7)$$

where $t_n$ are timestamps associated with samples selected from the data stream D indexed on n, such that 't' represents a vector comprising the timestamps $t_n$. For discussion purposes, an index '1' in equations (6) and (7) represents a first selected sample, an index '2' represents a second selected sample, and so on, to a last selected sample denoted by an index 'N'. The first selected sample need not be a first sample in the data, the second sample need not be a second sample, and so on. In some embodiments, the last selected sample is a sample with a timestamp that is less than or equal to a last sample, n=|T|, (i.e., $(t_{|T|}, y_{|T|})$) of the data stream D.

One skilled in the art will readily recognize that other forms of the matrix A for determining an estimated spectrum S may exist and thus may be substituted for that described above without departing from the scope of the present invention. For example, another known form of the Fourier transform employs an exponential basis set instead of the equivalent sine/cosine basis set. Such a Fourier transform would yield a matrix A comprising terms of the form $e^{j2\pi t f}$. Such an alternative form of the matrix A is clearly within the scope of the present invention.

In general, the L-S matrix A is constructed 110 by selecting a number of samples from the data stream D, wherein the number is sufficient to achieve a targeted signal to noise ratio (SNR) of the estimated spectrum S produced by the L-S fit. Specifically, a set of samples is chosen from the data stream D. Then, an L-S matrix A is constructed 110 and the spectrum S is estimated therefrom by solving the L-S fitting problem. A SNR of the estimated spectrum S is then evaluated and if the SNR is less that the targeted SNR, additional samples are selected from the data stream D and added to the original samples in a newly constructed L-S matrix A. The estimated spectrum S is again determined and the SNR evaluated. The process of selecting and evaluating is repeated until the targeted SNR is achieved.

In some embodiments, the samples are chosen such that the L-S matrix A is nonsingular and a condition number of the L-S fitting problem is sufficiently large. In such embodiments, a measure proportional to the condition number of the L-S matrix A may be employed. For example, a QR factorization of the L-S matrix A may be employed to compute or generate a pair of L-S factor matrices Q and R. Then a measure based the factor matrix R may be employed to establish a sufficiency of the selected samples relative to the goal of achieving the targeted SNR. Specifically, if the factor matrix R meets a condition that a minimum value element of an absolute value of main diagonal elements of the factor matrix R is strictly greater than zero, then both the L-S matrix A and the factor matrix R are nonsingular. Moreover, the factor matrix R is nonsingular if a ratio of a maximum value element of an absolute value of main diagonal elements of the factor matrix R and a minimum value element of an absolute value of main diagonal elements of the factor matrix R is less than an arbitrary predetermined limit λ. As a result, the estimated spectrum S will have a sufficiently large signal to noise ratio (SNR). In other words, the SNR of the estimated spectrum will have achieved the targeted SNR. In terms of Matlab-style matrix functions max(•), min(•), abs(•) and diag(•), a targeted SNR will be met if the factor matrix R meets the condition given by equation (8)

$$\min(\text{abs}(\text{diag}(R))) > 0 \char`\^ \max(\text{abs}(\text{diag}(R)))/\min(\text{abs}(\text{diag}(R))) < \lambda \quad (8)$$

where min(•) is an element-wise minimum function that returns a minimum element of a vector argument, max(•) is an element-wise maximum function that returns a maximum element of a vector argument, abs(•) is an element-wise absolute value function that returns a vector of element-by-element absolute values (i.e., magnitudes) of a matrix argument, diag(•) is a diagonal function that returns a vector containing elements of a main diagonal of a matrix argument, and the symbol ∧ denotes an ordered 'and' function in which a left hand argument is evaluated before a right hand argument.

The predetermined limit λ may be determined without undue experimentation for a given situation. In some embodiments, the predetermined limit λ equal to approximately '1.1' (e.g., λ=1.1) essentially guarantees that a condition number of a given matrix R is approximately one (i.e., cond(R)≅1). When the condition number of the matrix R is approximately one, the SNR of the estimated spectrum S is approximately that of an SNR of the input data stream D. In other embodiments, especially where faster estimation is sought (i.e., faster estimation speed), larger values of the predetermined limit λ may be employed. In general, values of the predetermined limit λ ranging from approximately one up to or on the order of one thousand (i.e., $1 \leq \lambda \leq 1 \times 10^3$) may be employed to provide a trade off between the SNR of the estimated spectrum S and the estimation speed. In some embodiments, the arbitrary limit of l ranges from approximately one up to approximately one hundred.

In other embodiments, a slightly simpler condition on the matrix R that achieves much the same results as that given by equation (7) is given by equation (9)

$$\min(\text{abs}(\text{diag}(R))) > 0 \char`\^ 1/\min(\text{abs}(\text{diag}(R))) < \lambda \quad (9)$$

Specifically, if R is strictly nonsingular, a targeted SNR is achieved if an inverse of a minimum value element of an absolute value of main diagonal elements of the matrix R is less than the arbitrary limit λ (e.g., less than '1.1').

In addition to determining a number of samples (e.g., $(t_n, y_n)$) of the data stream D to employ, in some embodiments, a minimum time step or time spacing between samples is determined to insure that the samples sufficiently span or otherwise represent characteristics of interest in the estimated spectrum S. In particular, in some embodiments, a minimum time step $\Delta t_{min}$ between samples is chosen such that at least two times a number of frequencies in the set of frequencies of interest F plus 1 (i.e., 2|F|+1) samples are taken from at least two periods of a lowest frequency of interest $f_1$ that is not equal to zero. A minimum time step $\Delta t_{min}$ given by equation (10)

$$\Delta t_{min} = 2/f_1/(2|F|+1) \tag{10}$$

generally insures that enough samples are taken from the lowest frequency of interest to perform spectral estimation.

In some embodiments, sets or groups of samples are selected instead of individual samples. In particular, groups of contiguous or adjacent samples may be selected to improve, through averaging, a SNR of the estimated spectrum S over and above that which would be provided by choosing individual samples. In other words, instead of selecting a first sample, $(t_a, y_a)$, followed by a second sample, $(t_b, y_b)$, groups (pairs, triplets, quadruplets, etc.) of adjacent samples in the data stream D may be chosen. For example, a first pair, $\{(t_a, y_a), (t_{a+1}, y_{a+1})\}$, is chosen followed by a second pair, $\{(t_b, y_b); (t_{b+1}, y_{b+1})\}$, and so on, wherein the samples times $t_n$ and $t_{n+1}$, where n=a or b, denote adjacent samples in the data stream D. In another example, a first triplet, $\{(t_a, y_a), (t_{a+}, y_{a+1}), (t_{a+2}, y_{a+2})\}$, is chosen followed by a second triplet, $\{(t_b, y_b), (t_{b+1}, y_{b+1}), (t_{b+2}, y_{b+2})\}$, and so on. In some embodiments, a time step or spacing between '$t_a$' of the first pair and '$t_b$' of the second pair is at least the minimum time step $\Delta t_{min}$. Hereinbelow, a factor referred to as 'oversample' will be used to denote a size of the sets of adjacent samples. For example, a value for oversample equal to two (i.e., oversample=2) indicates a set of 2 or a pair of adjacent samples.

Figure 2:
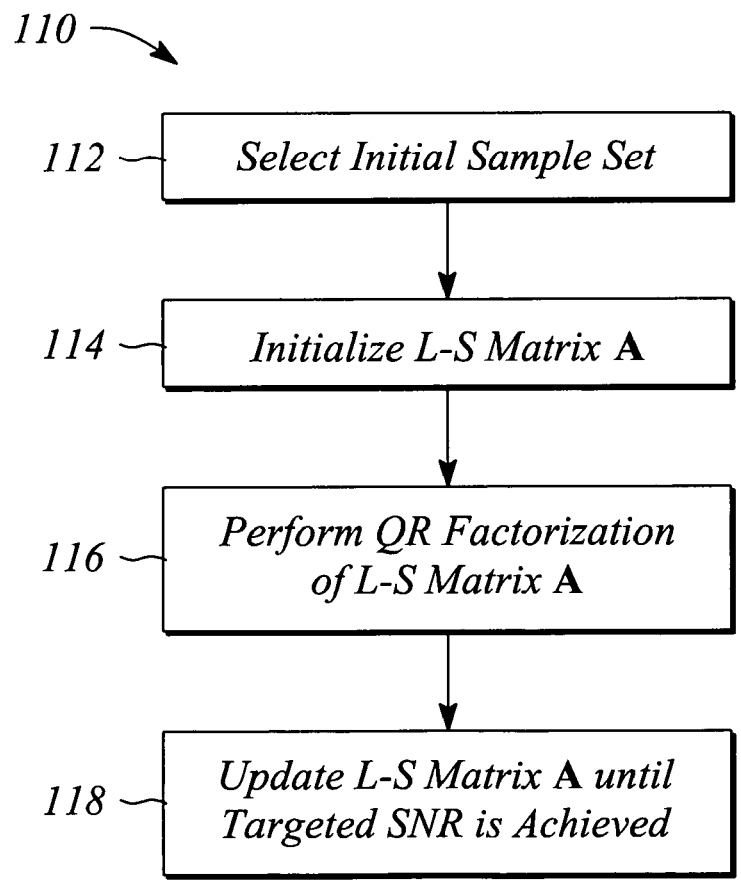
FIG. 2 illustrates a flow chart of constructing a least-squares (L-S) matrix A according to an embodiment of the present invention.

FIG. 2 illustrates a flow chart of constructing 110 a least-squares (L-S) matrix A according to an embodiment of the present invention. As illustrated in FIG. 2, constructing 110 comprises selecting 112 from the data stream D an initial set of samples. The initial set is selected 112 such that a number of selected samples is at least two times the number of frequencies of interest F plus one (i.e., at least 2|F|+1). A time spacing between each selected sample is greater than or equal to the minimum time step $\Delta t_{min}$. When groups of adjacent samples are selected 112 (i.e., oversample>1), the number of selected groups is at least 2|F|+1 and a time spacing between the groups (e.g., a first member of each group) is greater than or equal to the minimum time step $\Delta t_{min}$.

For example, if a set termed 'samplesused' represents a list of indices of the data stream D corresponding to the selected samples, and if 'I' is another list of indices, and where 'oversample' is a number of samples in each group, then in some embodiments, selecting 112 comprises (a) setting the list I equal to a group of oversample indices of the data stream D such that a timestamp $t_i$ of a first sample in the group is at least the minimum time step $\Delta t_{min}$ more than a timestamp $t_j$ of a sample identified by a last index in the set samplesused; and (b) adding the list I to an end of the set samplesused (i.e., set samplesused=samplesused∪I, where '∪' is a union operator), wherein (a) and (b) are repeated until (samplesused≧2|F|+1).

Constructing 110 further comprises initializing 114 an L-S matrix A of the L-S fitting using the frequencies of interest F and the timestamps $t_n$ of the selected 112 samples. In some embodiments, initializing 114 employs the L-S matrix A defined above by equation (5).

Constructing 110 further comprises performing 116 a QR factorization of the initialized 114 L-S matrix A to generate factor matrices Q and R, where factor matrix Q is orthonormal and factor matrix R is upper triangular. For example, performing 116 the QR factorization may be accomplished by using functions such as, but not limited to, a 'qr(A)' function of a computer program-based, matrix computational environment Matlab®, or a function 'DGEQRF' of a matrix function library LAPACK, for example.

Constructing 110 further comprises updating 118 the L-S fit with one or more additional samples until a spectral estimate produced by the method 100 of spectral estimation achieves a targeted signal to noise ratio. In some embodiments, updating 118 comprises adding one or more additional samples to the L-S matrix A and then recomputing the factor matrices Q and R from the updated L-S matrix A. In other embodiments, updating 118 comprises adding one or more additional samples to update the factor matrices Q and R without first explicitly updating the L-S matrix A. In other embodiments, both the L-S matrix A and the factor matrices Q and R are updated 118.

For example, since any updated 118 L-S matrix A comprises a previous L-S matrix Â plus the added samples, updated 118 factor matrices Q and R may be computed directly from the added samples and previous factor matrices Q̂ and R̂. Specifically, updating 118 comprises adding new or additional rows corresponding to the added samples to either or both of the previous L-S matrix Â and the previous factor matrices Q̂ and R̂. As such, the additional rows may be computed directly from rows of the previous factor matrices Q̂ and R̂ without explicitly updating 118 the L-S matrix A and performing 116 a QR factorization thereof. A method of directly updating 118 the factor matrices Q and R is given by Golub et al., *Matrix Computations, pp.* 596-597, incorporated herein by reference, cited supra. Additionally, updating 118 the factor matrices Q and R essentially eliminates any need for explicitly storing of the L-S matrix A in computer memory following performing 116 the QR factorization.

During updating 118, additional samples are selected from the data stream D and used for updating until a condition related to the targeted signal to noise ratio is achieved. In some embodiments, the condition is given by equation (8) described above. In other embodiments, a condition given by equation (9) described above is employed. In yet other embodiments, a condition number of one or both of the factor matrix R and the L-S matrix A may be employed.

For example, in some embodiments, the predetermined limit λ is chosen (e.g., λ≅1.1) and groups of samples $(t_n, y_n)$ are selected from the data stream D starting from a previous last sample used. The selected groups of samples are spaced apart in time by at least the minimum time step $\Delta t_{min}$, as described above with respect to selecting 112. Further, the groups contain a number of individual samples equal to oversample, as defined and described above with respect to selecting 112. Timestamps $t_n$ of the selected samples $(t_n, y_n)$ are used to create new rows in the Q and R matrices, thus updating 118 the matrices. The groups are selected and new rows created until the condition of equation (7) is met, for example. Having met the condition, a targeted signal to noise ratio of the estimated spectrum S is achieved.

The set of indices for samples used (e.g., samplesused) is updated as well to include the added selected samples. For example, updating the set of indices for samplesused to include the added selected samples may comprise (a) setting the list I equal to a group of oversample indices of the data stream D such that a timestamp $t_i$ of a first sample in the group is at least the minimum time step $\Delta t_{min}$ more than a timestamp $t_j$ of a sample identified by a last index in the set samplesused; and (b) adding I to an end of the set samplesused (i.e., set samplesused=samplesused∪I), wherein (a) and (b) are repeated until the condition of equation (7) is met.

Referring back to FIG. 1, the method 100 of spectral estimation further comprises solving 120 the L-S fitting problem for a solution vector x representing the coefficients of a Fourier transform. Solving 120 comprises setting a vector b equal to sample values $y_n$, where n is indexed on the samples used including those added during updating 118 (e.g., $b=[y_n]$, $n=1, \ldots$, samplesused). Solving 120 further comprises using the vector b and the factor matrices Q and R to solve for a solution vector x according to equation (11)

$$Rx = Q^T b \quad (11)$$

where '$Q^T$' is a transpose of the factor matrix Q. One skilled in the art is familiar with methods of solving matrix equations exemplified by equation (11).

The method 100 of spectral estimation further comprises extracting 130 the Fourier coefficients from the solution vector x. Extracting 130 the Fourier coefficients produces the estimated spectrum S. In some embodiments, extracting 130 comprises (a) setting a first real coefficient $c_0$ equal to a first element $x_1$ of the solution vector x; and (b) setting a first imaginary coefficient $s_0$ equal to '0' (i.e., $c_0=x_1$, $s_0=0$). For each frequency of the set of frequencies of interest F starting with $f_1$, setting (a) comprises setting each successive real coefficient $c_i$ equal to individual elements of the solution vector x indexed on i plus the size of the set of frequencies of interest F plus one. Additionally, for each frequency of the set of frequencies of interest F starting with $f_1$, setting (b) comprises setting each successive imaginary coefficient $s_i$ equal to individual elements of the solution vector x indexed on i plus one. In other words, for $i \in \{1, \ldots, |F|\}$, set $c_i = x_{i+|F|+1}$, $s_i = x_{i+1}$, where $x = [x_1, x_2, \ldots, x_{2|F|+1}]$.

In some embodiments, extracting 130 further comprises computing amplitude- and phases ($A_m$, $\phi_m$) of the estimated spectrum S from the real and imaginary coefficients ($c_m$, $s_m$). An i-th amplitude, $A_i$ is computed as the square root of a sum of the square of the i-th real coefficient $c_i$ and the i-th imaginary coefficient $s_i$, for i from zero to the size of the set of frequencies of interest F. The i-th phase, $\phi_i$ is computed as the inverse tangent of a ratio of the i-th imaginary coefficient $s_i$ and the i-th real coefficient $c_i$, for i from zero to the size of the set of frequencies of interest F. In other words, for $i \in \{0, \ldots, |F|\}$, computing amplitudes and phases comprises setting the i-th amplitude $A_i$ and the i-th phase $\phi_i$, respectively, according to the equations $$A_i = \sqrt{c_i^2 + s_i^2}, \phi_i = \tan^{-1}(s_i/c_i).$$

In some embodiments, the factor matrix Q is stored in memory after each iteration of updating 118. In other embodiments, the factor matrix Q is not stored explicitly. Instead, the factor matrix Q is stored initially, as described in a description of the DGEQRF routine of LAPACK, cited supra. While known to those skilled in the art, Anderson et al., *Lapack Users Guide*, 3<sup>rd</sup> ed., Society for Industrial Applied Mathematics Press, 2000, section entitled "QR Factorization", incorporated herein by reference, provides a complete description of the DGEQRF routine and the respective storage of the factor matrix Q thereby. Then, during updating 118 one or more Givens rotations describing the updating 118 of the factor matrix Q are stored. Thus, the initially stored factor matrix Q representation and a set of Givens rotations account for the updated 118 factor matrix Q instead of an explicitly stored and updated 118 factor matrix Q. In other words, rather than explicitly storing the updated factor matrix Q, a description of the matrix is stored as a set of steps required to multiply either the factor matrix Q or the transpose of the factor matrix $Q^T$ times a vector. Storing the factor matrix Q in this way may save both memory and computation time since ultimately it is the product of the factor matrix Q and a vector (i.e., the b vector) that is used by the method 100 of spectral estimation and not the factor matrix Q itself.

Figure 3:
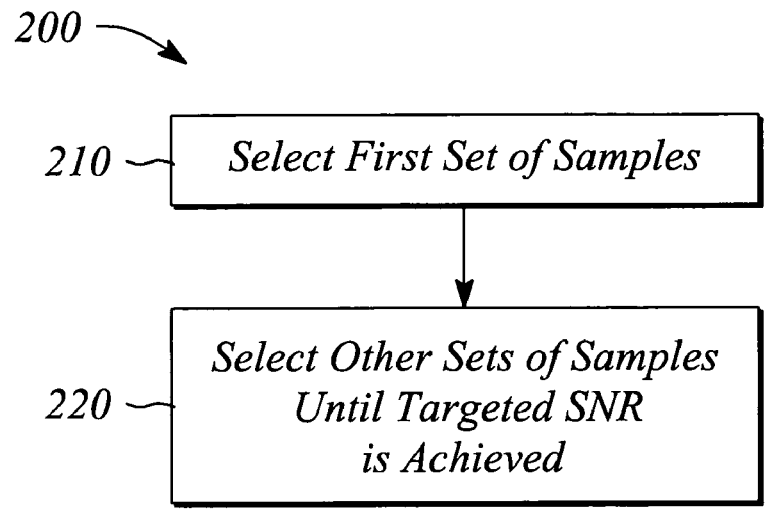
FIG. 3 illustrates a flow chart of a method of spectral estimation for a data stream D of sampled data according to an embodiment of the present invention.

FIG. 3 illustrates a flow chart of a method 200 of spectral estimation for a data stream D of sampled data according to an embodiment of the present invention. The method 200 comprises selecting 210 a first set of samples from the data stream D. The method 200 further comprises selecting 220 other sets of samples from the data stream D to successively combine with the first set to create a combined set of samples. The other sets are selected for combination until a measure of a signal to noise ratio for an estimated spectrum of the combined set of samples indicates a target signal to noise ratio is achieved. In some embodiments, selecting 210 is essentially similar to selecting 112 an initial sample set of the constructing 110 in the method 100 described above. Moreover, in some embodiments, selecting 220 and the method 200 employ aspects of the step of updating 118 also of constructing 110 of the method 100 described above.

Figure 4:
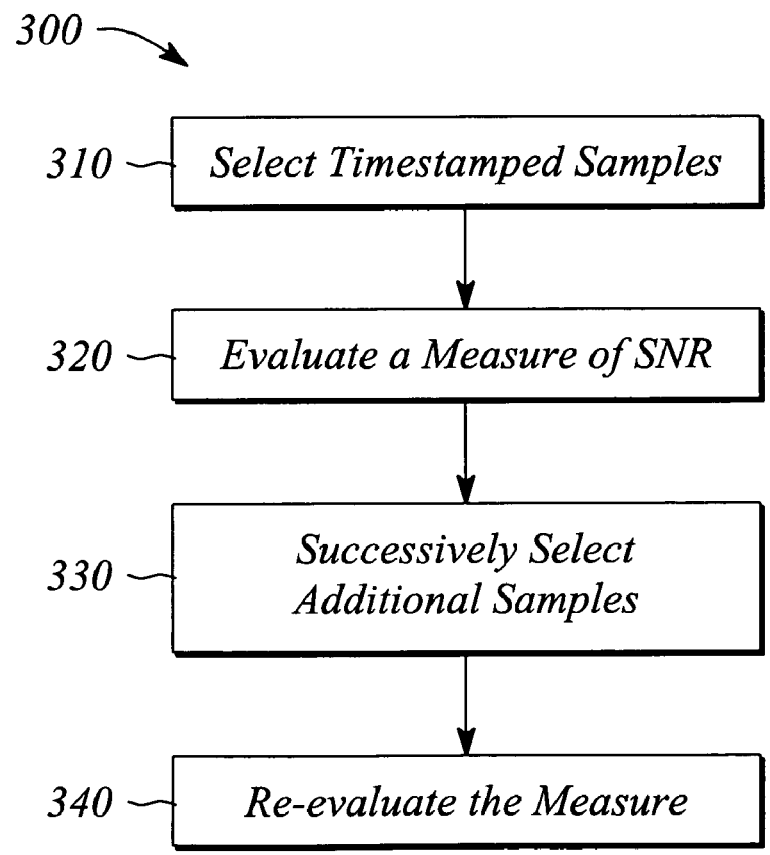
FIG. 4 illustrates a flow chart of a method of estimating a spectrum of sampled data at a set of frequencies of interest according to an embodiment of the present invention.

FIG. 4 illustrates a flow chart of a method 300 of estimating a spectrum of sampled data at a set of frequencies of interest according to an embodiment of the present invention. The method 300 comprises selecting 310 timestamped samples from the sampled data to produce a set of samples. The method 300 further comprises evaluating 320 a measure of a signal to noise ratio of an estimated spectrum for the set of samples. The method 300 further comprises successively selecting 330 additional timestamped samples to combine with the set of samples, and re-evaluating 340 the measure of the signal to noise ratio of the estimated spectrum for the combined set of samples. Repeat successively selecting and re-evaluating until the measure is less than a predetermined limit $\lambda$. When the measure of the signal to noise ratio is less than the predetermined limit $\lambda$, the target signal to noise ratio is achieved.

In some embodiments, selecting 310 is essentially similar to selecting 112 an initial sample set is essentially similar to of the constructing 110 in the method 100 described above. In some embodiments, evaluating 320 and the method 300 employ aspects of initializing 114 and performing 116 also of constructing 110 of the method 11 described above. Moreover, in some embodiments, successively selecting 330 and re-evaluating 340 are essentially similar to aspects of performing 116 and updating 118 of constructing 110 of the method 100 described above.

Figure 5:
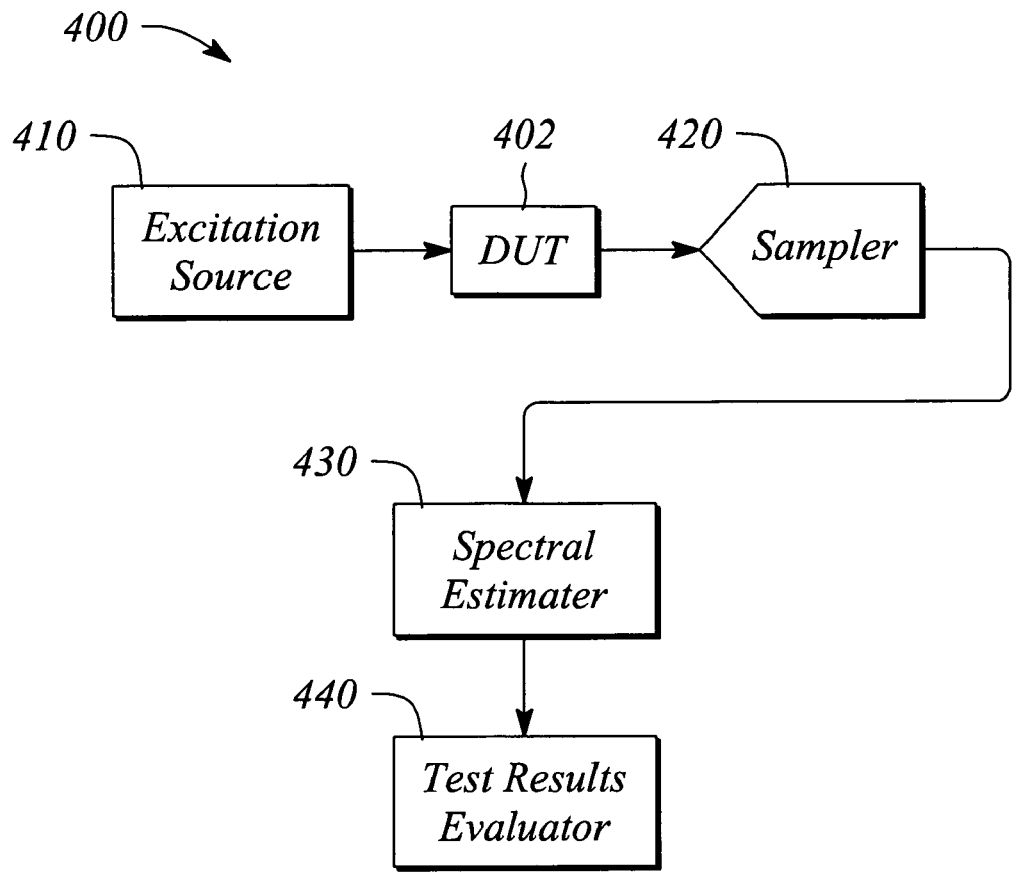
FIG. 5 illustrates a block diagram of a test system that employs spectral estimation according to an embodiment of the present invention.

FIG. 5 illustrates a block diagram of a test system 400 that employs spectral estimation of irregularly sampled data according to an embodiment of the present invention. The test system 400 samples an output signal produced by a device under test (DUT) and generates an estimated spectrum S of the output signal. The test system 400 measures and samples the output signal at irregular or random intervals. The samples are expressed in terms of timestamped sample amplitudes (e.g., $(t_n, y_n)$). In some embodiments, the estimated spectrum S is represented by a vector comprising amplitudes and phases of the spectrum S at predetermined frequencies of interest F. In other embodiments, the estimated spectrum S is represented by a vector comprising real and imaginary coefficients of the spectrum S at predetermined frequencies of interest F. In particular, the estimated spectrum S may be described as in equation (3) above.

The test system 400 comprises an excitation source 410. The excitation source generates an excitation signal that is applied to a device under test (DUT) 402. In some embodiments, the excitation source 410 is a periodic excitation source that generates an essentially periodic excitation signal.

In other embodiments, the excitation source 410 is a general purpose excitation source (e.g., arbitrary waveform generator) that generates one or both of an aperiodic excitation signal and an essentially periodic excitation signal. In yet other embodiments, the excitation source generates a null signal. For example, a null signal may be employed when testing a DUT 402 that incorporates an internal signal generator (e.g., a clock generator, a function generator, etc.). Such DUTs 402 do not require an excitation signal for test purposes. In such embodiments, the excitation source 410 may be omitted from the test system 400 and still be within the scope of the present invention.

The test system 400 further comprises a sampler 420. In some embodiments, the sampler 420 is an analog to digital converter (ADC). In other embodiments, essentially any instrument, sensor, or other means capable of measuring a physical quantity and delivering the measured quantity to a means of computation may be employed as the sampler 420. Examples include, but are not limited to, an oscilloscope triggered by a clock with a pre-determined trigger time (e.g., alarm), a smart sensor that may operate in a network or that is 'networkable' (see for example the IEEE 1451 series of standards). The sampler 420 samples an output signal generated by the DUT 402 and converts the samples of the output signal to timestamped sample amplitudes (e.g., $(t_n, y_n)$). In some embodiments, the output signal may be generated by a sensor 402 measuring a physical process (e.g., temperature) instead of by the DUT 402.

In some embodiments, the sampler 420 produces a data stream D comprising a sequence of timestamped sample amplitudes or sample data points. For example, the data stream D produced by the sampler 420 may be represented by equation (1) described above with respect to the method 100 of spectral estimation. Moreover, while described herein as explicit timestamps, the timestamps associated with the sample amplitudes of the data stream D may be one or more of explicit or implicit timestamps, as described above with respect to the method 100 of spectral estimation. In general, the sampler 420 samples at irregular intervals. However, the sampler 420 may sample at intervals that are one or more of irregular, random, and regular. When sampled at regular intervals, a set of irregular samples may result from a loss of one or more samples in the set during transmission from the sampler 420, for example.

The test system 400 further comprises a spectral estimator 430. The spectral estimator 430 receives the data stream D and generates an estimated spectrum S. The estimated spectrum S is generated for a set of arbitrary predetermined frequencies of interest F. For example, the set of frequencies of interest F may be an ordered set defined by equation (2) described above with respect to the method 100 of spectral estimation.

Figure 6:
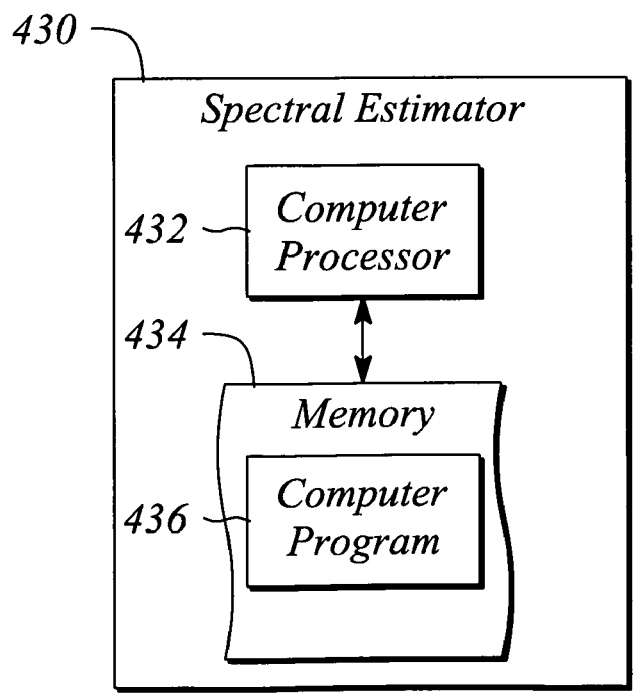
FIG. 6 illustrates a block diagram of a spectral estimator according to an embodiment of the present invention.

FIG. 6 illustrates a block diagram of the spectral estimator 430 according to an embodiment of the present invention. In some embodiments, the spectral estimator 430 determines a least squares fit of the available data to the estimated spectrum S. In some embodiments, the spectral estimator 430 comprises a computer processor 432, memory 434, and a computer program 436 that is stored in the memory 434 and executed by the computer processor 432. The computer processor 432 may be a general purpose computer processor or a specialized processor such as, but not limited to, a signal processor. The memory may be one or more of random access memory (RAM), read only memory (ROM), flash memory, or disk memory including, by not limited to, hard disk, compact disk (CD), floppy disk, and digital video disk (DVD), for example. The computer program 436 may be realized or classified as software or as firmware of the spectral estimator 430, in some embodiments. For example, the computer program 436 may be realized using a high level computer programming language or programming environment including, but not limited to, C/C++, FORTRAN, or Matlab®. In other embodiments, the computer program 436 may be realized as computer logic or hardware. For example, the computer program 430 may be essentially hardwired as discrete logic or as an application specific integrated circuit (ASIC). In such embodiments, the computer logic implementation may represent one or more of the computer processor 432 and the memory 434 as well as the computer program 436.

Regardless of a specific realization, the computer program 436 comprises instructions that, when executed by the processor 432, implement spectral estimation. In some embodiments, spectral estimation fits data from the data stream D to an estimated spectrum S in a least-squares manner. In some embodiments, the spectral estimation implemented by instructions of the computer program 436 comprises instructions that implement constructing a least-squares (L-S) matrix A and instructions that implement solving an L-S fitting problem to find the estimated spectrum S using the constructed L-S matrix A. The implemented spectral estimation further comprises instructions of the computer program 436 that implement evaluating a signal to noise ratio (SNR) of the estimated spectrum S produced by the L-S fit and instructions that implement selecting additional samples from the data stream D to add to the constructed L-S matrix A until a targeted or predetermined SNR is achieved.

In particular, in some embodiments, a QR factorization of the L-S matrix A is employed in the L-S problem solving. A condition on an R factor matrix of the QR factorization of the L-S matrix A is employed to evaluate whether a targeted SNR is achieved. In some of such embodiments, the condition is given by equation (8) described above. In other embodiments, a condition given by equation (9) described above is employed. In yet other embodiments, a condition number of one or both of the factor matrix R and the L-S matrix A is employed.

In some embodiments, constructing and evaluating is essentially similar to constructing 110 described above with respect to the method 100 of spectral estimation. In particular, instructions of the computer program 436 implement selecting from the data stream D an initial set of samples. In some embodiments, the implemented selecting is essentially similar to selecting 112 described above with respect to constructing 110 of the method 100 of spectral estimation. The instructions further implement initializing the L-S matrix A using the frequencies of interest F and timestamps $t_n$ of samples in the initial set. In some embodiments, the implemented initializing is essentially similar to initializing 114 described above with respect to constructing 110 of the method 100 of spectral estimation. The instructions further implement performing a QR factorization of the initialized L-S matrix A to generate factor matrices Q and R. In some embodiments, the implemented performing is essentially similar to performing 116 described above with respect to constructing 110 of the method 100 of spectral estimation. The instructions further implement updating the L-S fit with one or more additional samples until a spectral estimate S achieves the targeted SNR as given by the condition on the factor matrix R. In some embodiments, the implemented updating is essentially similar to updating 118 described above with respect to constructing 110 of the method 100 of spectral estimation.

In some embodiments, the computer program 436 further comprises instructions that implement solving the L-S fitting problem for coefficients of the Fourier transform. In particular, an equation of the form of equation (11) described above may be employed to solve for the Fourier transform coefficients. In particular, in some embodiments, the implemented solving may be essentially similar to solving 120 described above with respect to the method 100 of spectral estimation.

In some embodiments, the computer program 436 further comprises instructions that implement extracting the Fourier coefficients to produce the estimated spectrum S. The implemented extracting may be essentially similar to extracting 130 described above with respect to the method 100 of spectral estimation. In particular, extracting may produce the estimated spectrum S in the form of real and imaginary coefficients ($c_m$, $s_m$) or amplitude and phase coefficients ($A_m$, $\phi_m$) indexed on the frequencies of interest F.

In other embodiments of the spectral estimator 430, the computer program 436 comprises instructions that implement selecting a first set of samples from a data stream of timestamped samples, and instructions that implement subsequently selecting other sets of timestamped samples to successively combine with the first set to create a combined set of samples. The other sets are successively combined until a measure of a signal to noise ratio for an estimated spectrum of the combined set of samples indicates a target signal to noise ratio is achieved. In some embodiments, selecting a first set of samples is essentially similar to selecting 220 in the method 200, described above. Moreover, in some embodiments, selecting other sets of timestamped samples to successively combine is essentially similar to selecting 220 other sets of samples also of the method 200, described above.

In another embodiment of the spectral estimator 430, the computer program 436 comprises instructions that implement selecting timestamped samples from the sampled data to produce a set of samples, and evaluating a measure of a signal to noise ratio of an estimated spectrum for the set of samples. The computer program 436 further comprises instructions that implement successively selecting additional timestamped samples to combine with the set of samples, and re-evaluating the measure of the signal to noise ratio of the estimated spectrum for the combined set of samples until the measure is less than a predetermined limit $\lambda$. When the measure of the signal to noise ratio is less than the predetermined limit $\lambda$, a target signal to noise ratio is achieved.

In some embodiments, selecting timestamped samples is essentially similar to selecting 310 in the method 300, described above. In some embodiments, evaluating a measure of a signal to noise ratio is essentially similar to evaluating 320 also in the method 300, described above. Moreover, in some embodiments, successively selecting additional timestamped samples to combine with the set of samples is essentially similar to successively selecting 330 in method 300 and re-evaluating the measure of the signal to noise ratio is essentially similar to re-evaluating 340 also in method 300, described above.

Referring back to FIG. 5, in some embodiments, the test system 400 further comprises a test results evaluator 440. The test results evaluator 440 receives the estimated spectrum S from the spectral estimator 430. The received estimated spectrum S is compared to predetermined spectrum criteria or specifications for the DUT 402. If the estimated spectrum S of the DUT 402 meets the criteria, the results evaluator 440 assigns a passing result to the DUT 402. If the estimated spectrum S fails to meet one or more of the criteria, a failing result is assigned to the DUT 402 by the results evaluator 440. In some embodiments, (not illustrated) the results evaluator 440 is implemented realized as a portion of the computer program 436 of the spectral estimator 430.

Thus, there have been described embodiments of a method of spectral estimation, a test system that employs spectral estimation and a spectral estimator. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. A computer-implemented method of spectral estimation of a signal represented by a data stream D of sampled data from that signal, the method comprising:
   (1) selecting a first set of samples from the data stream D;
   (2) initializing a combined set of samples with said first set;
   (3) selecting a set of data samples which is not in the combined set of samples;
   (4) combining the selected set of data samples with the combined set of samples to create an updated combined set of samples;
   (5) determining a measure of signal-to-noise ratio of an estimated spectrum for the updated combined set of samples;
   (6) comparing said determined measure to a target measure determined for a target signal-to-noise ratio;
   (7) repeating steps (3)-(6) until said determined measure has a predetermined relationship to said target measure; and
   (8) providing said estimated spectrum as an output representing said signal.

2. The method of spectral estimation of claim 1, wherein the target signal to noise ratio is achieved when the determined measure is less than a predetermined limit $\lambda$.

3. The method of spectral estimation of claim 1, wherein the determined measure is proportional to a condition number of a least-squares (L-S) matrix A of a least-squares fit of the combined sample set to the estimated spectrum.

4. The method of spectral estimation of claim 1, wherein the targeted signal to noise ratio is achieved when an upper right triangular factor matrix R of a QR factorization of a least squares matrix (L-S) matrix A of a least squares fit of the combined sample set to an estimated spectrum meets a condition given by $$\min(\mathrm{abs}(\mathrm{diag}(R))) > 0 ˆ 1/\min(\mathrm{abs}(\mathrm{diag}(R))) < \lambda.$$

where $\lambda$ is a predetermined limit equal to or greater than approximately 1.1 and less than approximately 1,000.

5. The method of spectral estimation of claim 1, wherein the targeted signal to noise ratio is achieved when an upper right triangular factor matrix R of a QR factorization of a least squares matrix (L-S) matrix A of a least squares fit of the combined sample set to an estimated spectrum meets a condition given by $$\min(\mathrm{abs}(\mathrm{diag}(R))) >ˆ \max(\mathrm{abs}(\mathrm{diag}(R)))/\min(\mathrm{abs}(\mathrm{diag}(R))) \lambda.$$

where $\lambda$ is a predetermined limit equal to or greater than approximately 1.1 and less than approximately 1,000.

6. The method of spectral estimation of claim 1,
   determining an upper right triangular factor matrix R of a QR factorization of a least-squares (L-S) matrix A of a least-squares fit of the combined sample set to an estimated spectrum,
   wherein the measure of the signal to noise ratio is a ratio of selected diagonal elements of the QR factorization of the L-S matrix A when the factor matrix R is nonsingular.

7. The method of spectral estimation of claim 6, wherein the ratio of selected diagonal elements is one or both of a maximum value ratio of an element selected from an element-wise absolute value of a main diagonal of the factor matrix R to a minimum value element selected from the element-wise absolute value of the main diagonal and a ratio that is an inverse of a minimum value element selected from an element-wise absolute value of a main diagonal of the factor matrix R.

8. The method of spectral estimation of claim 7, wherein the predetermined limit $\lambda$ is equal to or greater than approximately 1.1 and less than approximately 1,000.

9. The method of spectral estimation of claim 1, wherein selecting other sets of samples uses a minimum time step $\Delta t_{min}$ between corresponding samples in the selected sets, and wherein selecting other sets of samples comprises taking a quantity of samples equaling at least two times a number of frequencies in a set of frequencies of interest F plus 1 from at least two periods of a lowest frequency of interest $f_l$, the lowest frequency of interest $f_l$ being greater than zero Hertz.

10. The method of spectral estimation of claim 1, wherein a minimum time step $\Delta t_{min}$ between selected sets is given by $$\Delta t_{min} = 2/f_1/(2|F1+1)$$

where |F| is a number of frequencies in a set of frequencies of interest F and $f_1$ is a lowest frequency greater than zero Hertz in the set of frequencies of interest F.

11. The method of spectral estimation of claim 1, further comprising:
computing an estimated spectrum by solving a least-squares fitting problem for the combined set; and
extracting Fourier coefficients of the estimated spectrum from a solution to the least-squares fitting problem.

12. The method of spectral estimation of claim 1, wherein the data stream D comprises irregularly spaced, time-sampled data.

13. The method of spectral estimation of claim 1, wherein the samples of the selected sets from the data stream D comprise pairs of values, each pair comprising an explicit timestamp and a sample value.

* * * * *

UNITED STATES PATENT AND TRADEMARK OFFICE
CERTIFICATE OF CORRECTION

| | | |
|---|---|---|
| PATENT NO. | : 7,720,644 B2 | Page 1 of 1 |
| APPLICATION NO. | : 11/229479 | |
| DATED | : May 18, 2010 | |
| INVENTOR(S) | : Lee A. Barford | |

It is certified that error appears in the above-identified patent and that said Letters Patent is hereby corrected as shown below:

In column 16, line 46, in Claim 4, delete "<$\lambda$." and insert -- <$\lambda$ --, therefor.

In column 18, line 4, in Claim 10, delete "(2|F1+1)" and insert -- (2|F|+1) --, therefor.

In column 18, line 6, in Claim 10, delete "|F1" and insert -- |F| --, therefor.

Signed and Sealed this

Twenty-seventh Day of July, 2010

David J. Kappos
*Director of the United States Patent and Trademark Office*